United States Patent
Morton et al.

(10) Patent No.: US 6,327,572 B1
(45) Date of Patent: Dec. 4, 2001

(54) VIRAL MARKETING FOR VOICE-ACCESSIBLE INFORMATION SERVICE

(75) Inventors: David L. Morton; Bradley W. Barham, both of Sandy; Brian L. Charlesworth, North Salt Lake; Jeffrey C. Hays, Sandy, all of UT (US)

(73) Assignee: Talk2 Technologies, Inc., Salt Lake City, UT (US)

( * ) Notice: Subject to any disclaimer, the term of this patent is extended or adjusted under 35 U.S.C. 154(b) by 0 days.

(21) Appl. No.: 09/464,990

(22) Filed: Dec. 16, 1999

Related U.S. Application Data

(63) Continuation-in-part of application No. 09/417,295, filed on Oct. 13, 1999.

(51) Int. Cl.$^7$ .................................................. G06F 17/60

(52) U.S. Cl. ............................. 705/10; 705/14; 379/900

(58) Field of Search ................... 705/10, 14; 379/88.19, 379/88.22, 88.09, 88.2, 907, 900, 93.12

(56) References Cited

U.S. PATENT DOCUMENTS

| | | | |
|---|---|---|---|
| 4,788,682 | * 11/1988 | Vij et al. | 370/110.1 |
| 5,448,625 | * 9/1995 | Lederman | 379/67 |
| 5,608,786 | * 3/1997 | Gordon | 379/100 |
| 5,799,063 | 8/1998 | Krane | 379/67 |
| 5,883,940 | * 3/1999 | Thornton | 379/88.2 |
| 5,884,262 | 3/1999 | Wise et al. | 704/270 |

(List continued on next page.)

FOREIGN PATENT DOCUMENTS

WO200073931A2 * 12/2000 (WO) ............................. G06F/17/60

OTHER PUBLICATIONS

Culnan, "'How did they get my name?': An exploratory investigation of consumer attitudes toward secondary information use," MIS Quarterly, Sep. 1993, vol. 17, No. 3, 26 pages.*

Hibbard, "E-mail mining tools," Information Week, Dec. 14, 1998, p. 91.*

Jurvetson et al., "Viral Marketing," Netscape M-Files, 1997, 5 pages.*

"eVoice is Fastest Growing Website from Feb. to Apr. According to Media Matrix," Business Wire, Jun. 7, 2000, 2 pages.*

Primary Examiner—Eric W. Stamber
Assistant Examiner—Marc Norman
(74) Attorney, Agent, or Firm—Workman, Nydegger & Seeley

(57) ABSTRACT

Methods for introducing information services to potential customers. The information services can provide Internet access, value-added telephone services, and the like. As a non-customer or, in other words, a potential customer, issues a communication request to a customer of the information service, the potential customer is allowed to access certain features of the information service. The communication request can be a telephone call directed to a customer. For example, as the potential customer holds while waiting to speak with a customer, the potential customer can browse the Internet using a telephone interface. The potential customer is also informed how he or she can become a subscriber or the information service. As the potential customer interacts with the information service, the potential customer's interaction is tracked and stored in order to customize the information service to the particular potential customer during a subsequent interaction. Potential customers can also access the information service in other situations, including when a current customer sends e-mail to a potential customer, places a telephone call to the potential customer, or submits to the information service a contact database listing the potential customer as a contact.

28 Claims, 5 Drawing Sheets

U.S. PATENT DOCUMENTS

| | | | |
|---|---|---|---|
| 5,915,243 | * | 6/1999 | Smolen .................................... 705/14 |
| 5,937,037 | * | 8/1999 | Kamel et al. ...................... 379/88.19 |
| 6,009,150 | * | 12/1999 | Kamel ............................... 379/88.22 |
| 6,028,920 | * | 2/2000 | Carson ................................. 379/144 |
| 6,084,628 | * | 7/2000 | Sawyer .................................. 348/14 |
| 6,097,792 | * | 8/2000 | Thornton ............................ 379/88.2 |

* cited by examiner

| | Beginning Subscribers | Interactions With Sub | Marketing Opportunities | Activation Percentage | New Subs | Ending Subscribers |
|---|---|---|---|---|---|---|
| MONTH 1 | 10,000 | 400 | 4,000,000 | 0.10% | 4,000 | 14,000 |
| MONTH 2 | 14,000 | 400 | 5,600,000 | 0.10% | 5,600 | 19,600 |
| MONTH 3 | 19,600 | 400 | 7,840,000 | 0.10% | 7,840 | 24,440 |
| MONTH 4 | 27,440 | 400 | 10,976,000 | 0.10% | 10,976 | 38,416 |
| MONTH 5 | 38,416 | 400 | 15,366,400 | 0.10% | 15,366 | 53,782 |
| MONTH 6 | 53,782 | 400 | 21,512,960 | 0.10% | 21,513 | 75,295 |
| MONTH 7 | 75,295 | 400 | 30,118,144 | 0.10% | 30,118 | 105,414 |
| MONTH 8 | 105,414 | 400 | 42,165,402 | 0.10% | 42,165 | 147,579 |
| MONTH 9 | 147,579 | 400 | 59,031,562 | 0.10% | 59,032 | 206,610 |
| MONTH 10 | 206,610 | 400 | 82,644,187 | 0.10% | 82,644 | 289,255 |
| MONTH 11 | 289,255 | 400 | 115,701,862 | 0.10% | 115,702 | 404,957 |
| MONTH 12 | 404,957 | 400 | 161,982,607 | 0.10% | 161,983 | 566,939 |

FIG. 1

VIRAL MARKETING FOR VOICE-ACCESSIBLE INFORMATION SERVICE

RELATED APPLICATION

This application is a continuation-in-part of U.S. patent application Ser. No. 09/417,295, entitled "Viral Marketing for Voice Accessible Information Service," filed Oct. 13, 1999, which is incorporated herein by reference.

BACKGROUND OF THE INVENTION

1. The Field of the Invention

The present invention relates to methods for marketing information services to potential customers. More specifically, the present invention relates to methods for introducing potential customers to information services having a voice-based interface.

2. The Prior State of the Art

In general, marketing is a deliberate process of introducing goods and services to potential consumers. The type of marketing that may be appropriate for any given situation depends largely on the goods and services being offered, the demographics of the potential or target consumers, and the amount of capital allocated to the effort. For example, running late afternoon radio and television advertisements may be ideal for a national fast-food restaurant chain, yet sub-optimal for telephony-based information services.

Nevertheless, most marketing strategies, to one degree or another, have at least one element in common: the need for endorsement. Athletes, musicians, actors, models, physicians, authors, commentators, academicians, educators, politicians, neighbors, friends, family, and in truth, almost anyone, can provide endorsement for a product or service. Naturally, some endorsements are more effective than others, but fame and notoriety may not necessarily be the most significant characteristic, especially when factoring in the expense of securing a celebrity endorsement. In some circumstances, neighbors, friends, family, personal acquaintances, or even a stranger making a similar purchase may all provide endorsement that is highly effective without expense.

Not all endorsements, however, need be explicit. Rather than commenting on the quality or other advantages of a product or service, an endorser's mere use may provide significant value. For example, one common form of implicit endorsement is the placement of products and services in motion pictures. Another common form of implicit endorsement involves athletes wearing shoes, clothing, and accessories, all having a prominently placed manufacturer's logo or other identifier. This type of implicit endorsement allows the endorser to accomplish a primary task, such as making a movie or playing a basketball game, without the endorsement interfering with the task. Of course, implicit endorsements are unlikely to be any less expensive than a corresponding explicit endorsement.

Perhaps the most significant value of implicit endorsement occurs when each consumer of the product or service seeking attention, makes the endorsement. Logos or other identifiers on clothing, automobiles, shoes, watches, sporting equipment, etc., transform consumers into endorsers. Moreover, depending on the current vogue, most consumers are willing if not anxious to participate, at times paying a premium for the opportunity.

A significant portion of implicit endorsement's impact can be attributed to the social nature of people. In other words, implicit endorsement is a viable marketing tool because people interact. To the extent that a product or service is identified, an increased number of interactions yields increased endorsement. Unfortunately, implicit endorsement typically requires in-person interaction because the logos and other identifiers leading to implicit endorsement are visual.

In an Internet context, one example of the marketing potential that is available through implicit endorsement is the e-mail service provided by Hotmail. Hotmail offers e-mail accounts that are free for the asking. In exchange, each e-mail sent by Hotmail includes a short reference to the free e-mail account offer and how one could obtain further information. Each e-mail sent or, in other words, each interaction, is an implicit endorsement that the sender approves of the Hotmail service. Within a relatively short time period, Hotmail has attracted an extremely large number of users, and eventually the business sold for hundreds of millions of dollars. Once again, however, the implicit endorsement successful in promoting Hotmail required a visual message.

The visual contact frequently required for implicit endorsement leaves many interactions between people unexploited as marketing opportunities. Specifically, during the course of any given day, a person may interact with far more people through telephone conversations than in person. Furthermore, as telephones have become increasingly portable, both in terms of reduced size, making them more convenient to carry, and in terms of improved coverage, making them almost universally available, telephone use and interaction have increased as well. During recent years, a large number of secondary or value-added telephone services have been developed. These include voice mail, voice messaging, call waiting, caller ID, answering services, conference calling, unified messaging services. Such secondary telephone services have benefited consumers by increasing the convenience of using the telephone, and have also benefited the companies that provide the services with increased revenue opportunities.

Likewise, as evidenced by the Internet's explosive growth, people are interacting through the Internet in ever increasing numbers. In many cases, the telephone and the Internet may provide the primary social interaction between people who are separated only by relatively insignificant geographical distances. Moreover, providing telephone access may be beneficial to a wide range of information-oriented businesses. In some ways, telephone and Internet technologies have begun to merge, with Internet telephone services, unified messaging services, and the like, all being developed or offered to consumers. However, in order to market these services, telephone and Internet enterprises have traditionally relied on conventional print, broadcast, or digital media. What is lacking in the prior art is an effective method for marketing an information or telephony service with a voice-based interface.

SUMMARY OF THE INVENTION

The problems in the prior state of the art have been successfully overcome by the present invention that is directed to methods for introducing potential customers to an information service having a voice-based interface. The methods exploit the social nature of the telephone and the increasing popularity of information services by providing for implicit endorsement of an information service that includes a significant aural component.

For example, the information service may act as an intermediary between a customer of the information service and a non-customer who is attempting to communicate with the customer. For purposes of the following description, the non-customer of the information service is considered to be a potential customer to which the marketing methods of the invention are directed. When the potential customer initiates a communication request, the information service receives the request for the customer. In response, the information service identifies the potential customer and provides the potential customer an opportunity to interact with the information service. While the potential customer interacts with the information service, the information service contacts its customer regarding the communication request. Once contacted, the customer determines how the communication request should be handled and then operates as instructed by the customer.

The communication request initiated by the potential customer may be a telephone call directed to the customer. In this case, one facet of the information service is an answering service that screens incoming telephone calls, routes incoming calls, or otherwise manages telephone communication directed to the customer. When a potential customer places a telephone call to the customer, the information service receives the telephone call and identifies the potential customer using, for example, caller ID information associated with the potential customer. While the potential customer waits for the information service to reach the customer being called, the potential customer is allowed to interact with the information service.

Alternatively, a subscriber to an information service may initiate the communication request. In this situation, the information service accesses contact information to identify the potential customer who is the target of the communication request. Using the contact information, the information service informs the potential customer that the current subscriber can be reached through the information service. In addition, the information service provides the potential customer with an opportunity to interact with the information service.

In one example of the current subscriber initiating the communication request, the current subscriber composes an e-mail directed to a potential customer. The information service uses the subscriber's contact information to determine the potential customer's telephone number. In addition to the normal e-mail processing and transmission, the information service places a telephone call to the potential customer, informing the potential customer of the e-mail sent by the subscriber. The information service also offers to read the e-mail to the potential customer, who thereby has an opportunity to interact with the information service.

The foregoing marketing techniques provide significant advantages over the conventional print, broadcast, and digital media that have been traditionally used to market telephone services and telephony-based information services Because potential customers are given the opportunity to experience the features of the services according to the invention, the potential customers are able to make an informed decision about the services. Moreover, the marketing methods are specifically directed to persons who are using the telephone or an information service, and such persons may be likely to be interested in becoming customers. As customers are exposed to the services, there is an implicit endorsement of the services by the current customer. In addition, the current customer making the implicit endorsement is relatively likely to be a person trusted or respected by the potential customer. The cost of providing the marketing opportunities to potential customers is low, since the operator of the information service uses a medium, namely the telephone infrastructure, that is already being used to provide the information service. In contrast to the use of traditional print and broadcast marketing, the operator of the information service does not need to pay a third party to provide advertising services.

These and other features, and advantages of the present invention will become more fully apparent from the following description and appended claims, or may be learned by practicing the invention as set forth below.

BRIEF DESCRIPTION OF THE DRAWINGS

A more extensive description of the present invention, including the above-recited features and advantages will be rendered with reference to the specific embodiments that are illustrated in the appended drawings. Because these drawings depict only exemplary embodiments, the drawings should not be construed as imposing any limitation on the present invention's scope. As such, the present invention will be described and explained with additional specificity and detail through use of the accompanying drawings in which:

FIG. 1 is a table showing the compounding growth that may be achieved using the present invention;

DETAILED DESCRIPTION OF THE PREFERRED EMBODIMENTS

Figure 2:
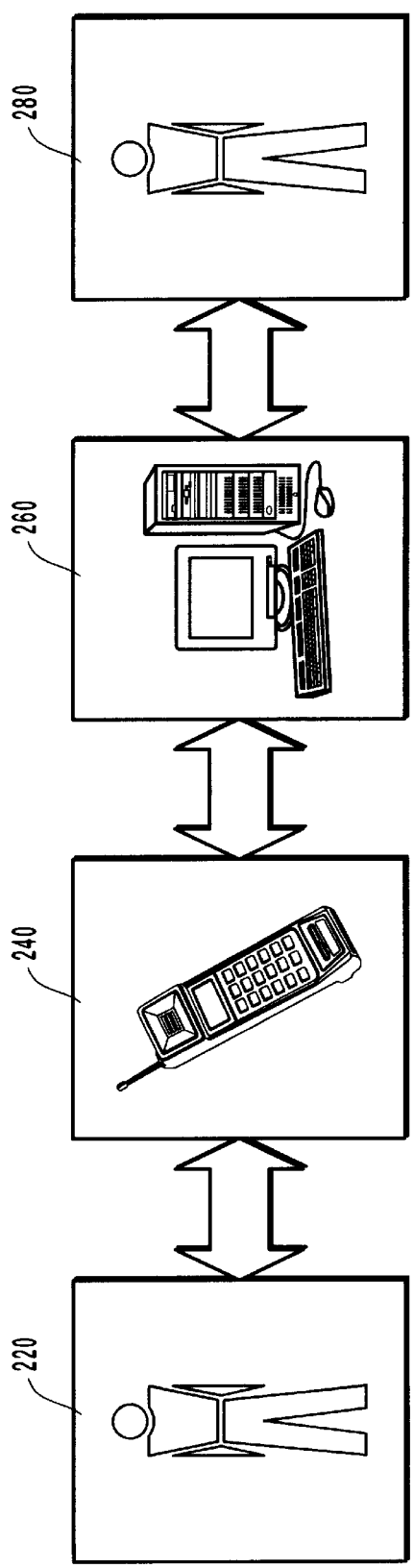
FIG. 2 is a block diagram showing the basic components present in various embodiments of the present invention.

The invention is described below with reference to drawings. These drawings illustrate certain details of specific embodiments that implement the methods of the present invention. However, describing the invention with drawings should not be construed as imposing, on the invention, any limitations that may be present in the drawings.

The present invention relates to methods for introducing potential customers to information services having a voice-based interface. Potential customers initiate communication requests intended for customers of the information service. Upon receiving the information request, the information service identifies the potential customer and attempts to reach the intended customer. To introduce the potential customer to the information service, the information service allows the potential customer to interact with it.

According to the present invention, current subscribers may also initiate communication requests that introduce potential customers to the information service. The information service identifies the potential customer by contact information provided by the current subscriber. Once identified, the information service informs the potential customer of the communication request initiated by the current subscriber. In addition to informing the potential customer regarding the communication request, the information service allows the potential customer to interact with it.

According to the marketing methods of the invention, potential customers have the opportunity to interact with features of the information services, either before, during, or after communication is established with a customer. In other instances, the attempt to establish communication with a customer in response to a communication request issued by a potential customer may be unsuccessful because, for example, the customer may not be presently available. In such situations, the potential customer can be introduced to the features of the information services, nonetheless. In any of the foregoing situations, the potential customer is allowed to interact with the information services as the information service processes the communication request. Accordingly, the phrase "as the information service processes the communication request," as used herein, is to extend to any phase of the communication conducted by the potential customer, regardless of whether the interaction by the potential customer with the information service occurs prior to, during, or after communication between the customer and the potential customer or whether the attempt to establish communication was successful.

FIG. 1 is a table showing the growth that is possible due to the compounding effect of the present invention. While the table of FIG. 1 is not intended to imply that any marketing effort conducted according to the invention will experience the compounded growth shown in the table, it does illustrate that the marketing methods of the invention can often expose increasingly large numbers of potential customers to the marketed goods or services at relatively small cost to the entity that provides the goods or services. The results of any particular marketing campaign will be determined by the percentage of potential customers exposed to the marketing techniques who become actual customers.

The example of FIG. 1 illustrates the results that might be achieved in marketing a telephone-based information service using the marketing techniques of the invention. The example of FIG. 1 is based on certain assumptions, including an initial subscriber base of 10,000 subscribers, 400 interactions with non-subscribers per month per subscriber, negligible attrition of actual subscribers, 0.10% of non-subscriber callers (i.e., potential subscribers) becoming actual subscribers, and negligible diminishing returns due to repeated exposure of the marketed services to individual potential customers. These assumptions are selected merely for illustration purposes. The invention extends to any marketing efforts conducted according to the techniques disclosed herein, regardless of whether actual response by potential customers to the marketing efforts bears resemblance to the assumptions underlying the table of FIG. 1. While the success of any given marketing campaign depends on a number of factors, FIG. 1 illustrates certain advantages of the marketing methods of the invention, namely, that the number of marketing opportunities increases with the number of subscribers and that the marketing opportunities are in many respects self-perpetuating.

Column 110 shows the number of subscribers at the beginning of each compounding time period. An exemplary number of contacts, in this chart telephone calls, between each subscriber and non-subscribers for each compounding period is shown in column 120. Column 130, labeled "Marketing Opportunities" shows the number of subscribers multiplied by the exemplary number of calls associated with each subscriber. In other words, column 130 is the number of contacts made with potential customers if each subscriber is associated with the number of contacts shown in column 120. Column 140 shows the percentage of potential customers contacted who decide to subscribe to the information service. Multiplying the number of potential customers contacted by the percentage of contacts who subscribe yields the number of new subscribers for the compounding period shown in column 150. Column 160 shows the total number of subscribers, the existing subscribers from column 110 plus the new subscribers from column 150, at the end of each compounding period. Data 170 represents twelve compounding periods, numbered 172 through 194.

The table begins by assuming 10,000 subscribers at the start of the first compounding period, month 1. If each subscriber averages 400 contacts during the month, then 4,000,000 contacts will be made. With an activation percentage of only 0.10%, there will be 4,000 new subscribers, resulting in 14,000 total subscribers at then end of month 1. By month 12, the beginning number of subscribers has grown to 404,957 who make a total of 161,982,607 contacts during the compounding period. The result is 161,983 new subscribers for a total of 566,939 subscribers at the end of month 12.

FIG. 2 shows examples of basic components of an environment suitable for various embodiments of the present invention. These basic components are shown only to aid in the description of the present invention and should not be interpreted as limitations on the scope of the appended claims. Reference 220 indicates a potential customer of an information service. "Subscriber" is only one of many descriptive terms that may apply, including customer, user, etc. Similarly, reference 280 indicates a current subscriber, customer, user, etc., of an information service. Although many possible status descriptions (e.g., subscriber, customer, user, etc.) may be applied to both reference 220 and 280, potential customer 220 and customer 280 will be used throughout the remainder of the detailed description and this use is intended to cover the full range of status relationships within the scope of the present invention.

Potential customer 220 uses telephone 240 to communicate with customer 280 via information service 260. Telephone 240 represents a voice form of communication between potential customer 220 and information service 260. Telephone 240 represents one of many possible ways to generate a communication request directed to an information service having a voice- or telephony-based interface. The actual device used to generate the communication request is not relevant to the present invention, it is only important that the device be capable of operating with the interface provided by the information service.

Likewise, information service 260 is shown as a computer system. Again, information service 260 is not limited to any particular hardware implementation. Rather, information service 260 need only include a voice- or telephony-based interface for operating with telephone 240. However, information service 260 may also include many other types of interfaces that will be readily apparent to those skilled in the relevant art.

Furthermore, information service 260 may provide a wide variety of public or private information. For example, information service 260 may process e-mail messages, voice mail messages, requests for information from the Internet, such as World Wide Web ("Web") pages and newsgroup postings, financial information, audio and multimedia files, etc. Moreover, the information service may provide unified messaging services that include e-mail, faxes, voice mail, etc. The information service can also include any value-added or secondary telephone service, including answering services, call waiting, conference calling, and the like. The actual information or services provided are not critical to the present invention. It is only significant that information service 260 provide access to some information or services through a voice- or telephony-based interface.

Customer 280 also communicates with information service 260. The form of communication between customer 280 and information service 260 depends on how customer 280 uses information service 260. It is possible that customer 280 will communicate with information service 260 through a voice- or telephony-based interface and customer 280 may communicate with information service 260 through other interfaces that are well-known in the relevant art, or through some combination of interfaces.

Figure 3:
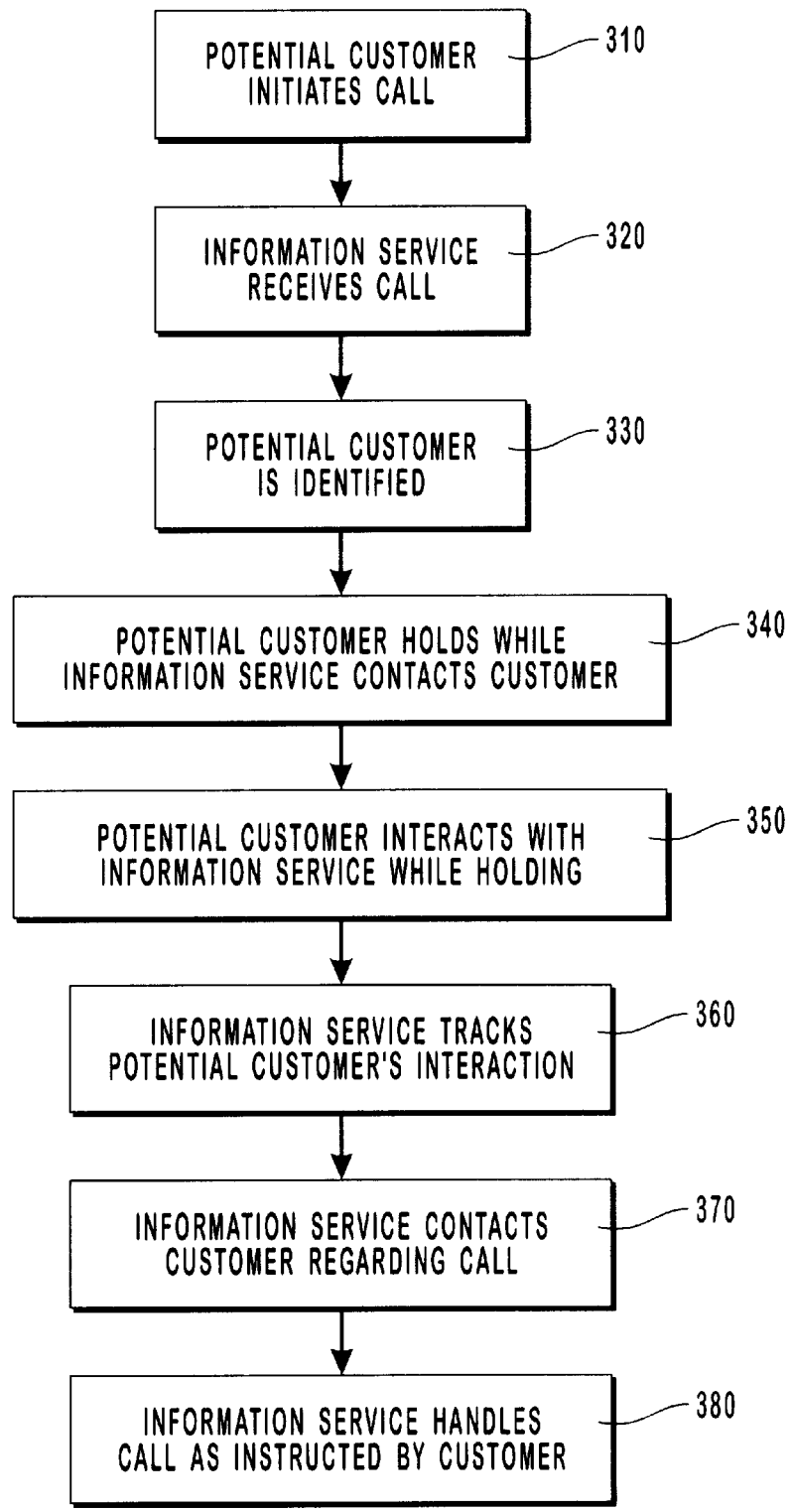
FIG. 3 is a flow chart illustrating a preferred embodiment of the present invention initiated by a telephone call.

Having shown some basic components that may be part of an environment suitable for the present invention, FIG. 3 shows the processing that occurs in one embodiment. The information service may utilize a personal number for accessing the customer. The personal number can include, but is not limited to, an existing telephone number associated with the customer or a new telephone number specifically assigned to the customer. In step 310, a potential customer initiates a telephone call directed to a current customer of the information service. A telephone call is one type of a communication request. The information service, at step 320 receives the communication request. For example, the information service may inform the potential customer that the information service answers or receives calls for the current customer. In step 330, the information service identifies the potential customer. Identification may be achieved through caller ID, require some further disclosure by the potential customer, through other steps, or a combination of the foregoing.

As indicated in step 340, the potential customer holds while the information service contacts the customer. Then, as shown in step 350, the potential customer has the opportunity of interacting with the information service during the call's standard hold time. For example, the information service may allow for browsing the Internet, retrieving financial data, such as stock quotes, interest rates, etc., selecting music to be played, or requesting any other information provided by the information service. The information service may also provide the potential customer with a brief demonstration of several features along with instructions of how further information may be obtained. The manner in which the information service interacts with the potential customer and the particular features of the information service are not critical to the marketing techniques of the invention. However, examples of systems and methods for accessing an information service using a telephone-based interface, which can be used with this invention to interact with the potential customer, are disclosed in U.S. patent application Ser. No. 09/464,989, entitled "Voice Interface for Electronic Documents", filed Dec. 16, 1999, which is incorporated herein by reference.

In step 360, the information service tracks the potential customer's interaction. This information may be useful in customizing a potential customer's subsequent interaction. For example, during the hold time of a subsequent call, the information service could remind the potential customer that during an earlier interaction, the potential customer had requested the price of a certain stock and then ask the potential customer if the potential customer would like to know the stock's current price. This tracking is one way that the information service shows how useful and powerful it is. The foregoing is also an example of how the invention can take advantage of a marketing opportunity in a customer/non-customer interaction.

As shown in step 370, the information service contacts the customer regarding the telephone call while the potential customer interacts with the information service. Having identified the potential customer, the information service can tell the customer who is calling. Furthermore, the information service may ask the potential customer regarding the subject of the call and pass this information to the customer as well. The customer then has the opportunity to determine how the call will be handled. For example, the customer may ask the information service to take a message, or to tell the potential customer to hold for a few minutes, or to inform the potential customer that the customer will return the telephone call at a later time, perhaps including a reason given by the customer.

Finally, in step 380, the information service reports back to the potential customer and handles the telephone call as instructed. While handling telephone call and reporting to the potential customer, the information service may allow for continued interaction. For example, after taking a message, the information service could resume operation at the point immediately preceding the message. Alternatively, the information service can give the potential customer the opportunity to resume interaction with the features of the information services after the potential customer has concluded speaking with the customer.

While FIG. 3 has been described in the context of a potential customer placing a call to a customer of the information service, the marketing opportunities and techniques described herein can also occur when a customer calls a potential customer. For example, when a potential customer receives a telephone call from a customer, the information service can offer to demonstrate the features of the information service to the potential customer, either before or after the potential customer speaks with the customer.

Figure 4:
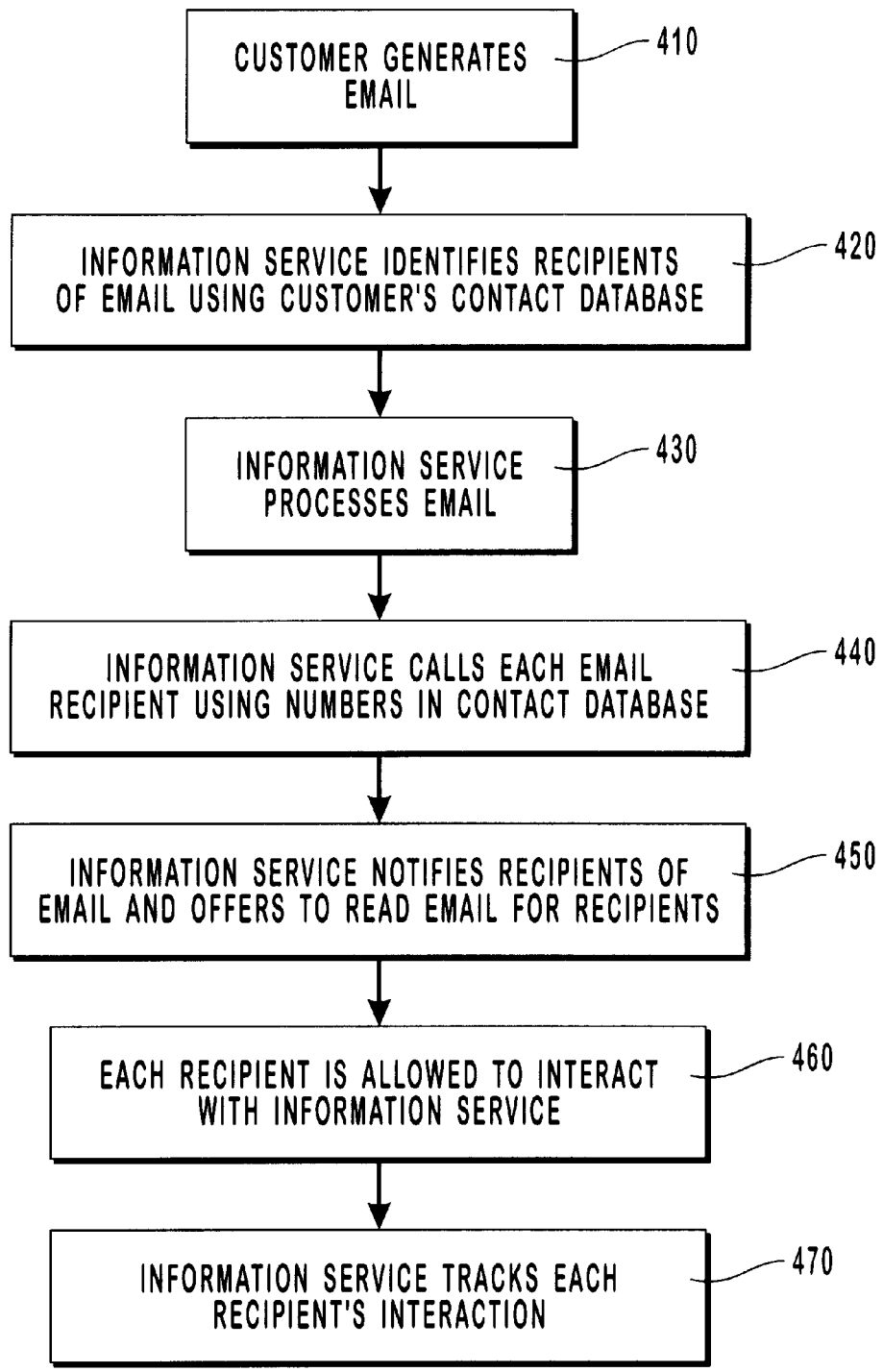
FIG. 4 is a flow chart illustrating a preferred embodiment of the present invention initiated by an e-mail.

FIG. 4 shows the processing of another embodiment of the present invention, where the customer sends an e-mail to a potential customer. In step 410, the customer generates the e-mail by composing and addressing a message. The information service, at step 420, uses the customer's contact database to identify each recipient of the e-mail.

Access to the contact database can be conducted in any way that is available or necessary in any particular situation. For example, the information service and the customer may be remote from each other. In this case, in order to provide the information access to the contact database, the customer may provide a complete copy of a contact database to the information service as part of an initial installation or subscription procedure. Then, as changes are made to the database, the information service may require updates. Regardless of the precise steps for providing the information service with access to the customer's contact database, in step 420, the information service identifies each e-mail recipient.

Figure 5:
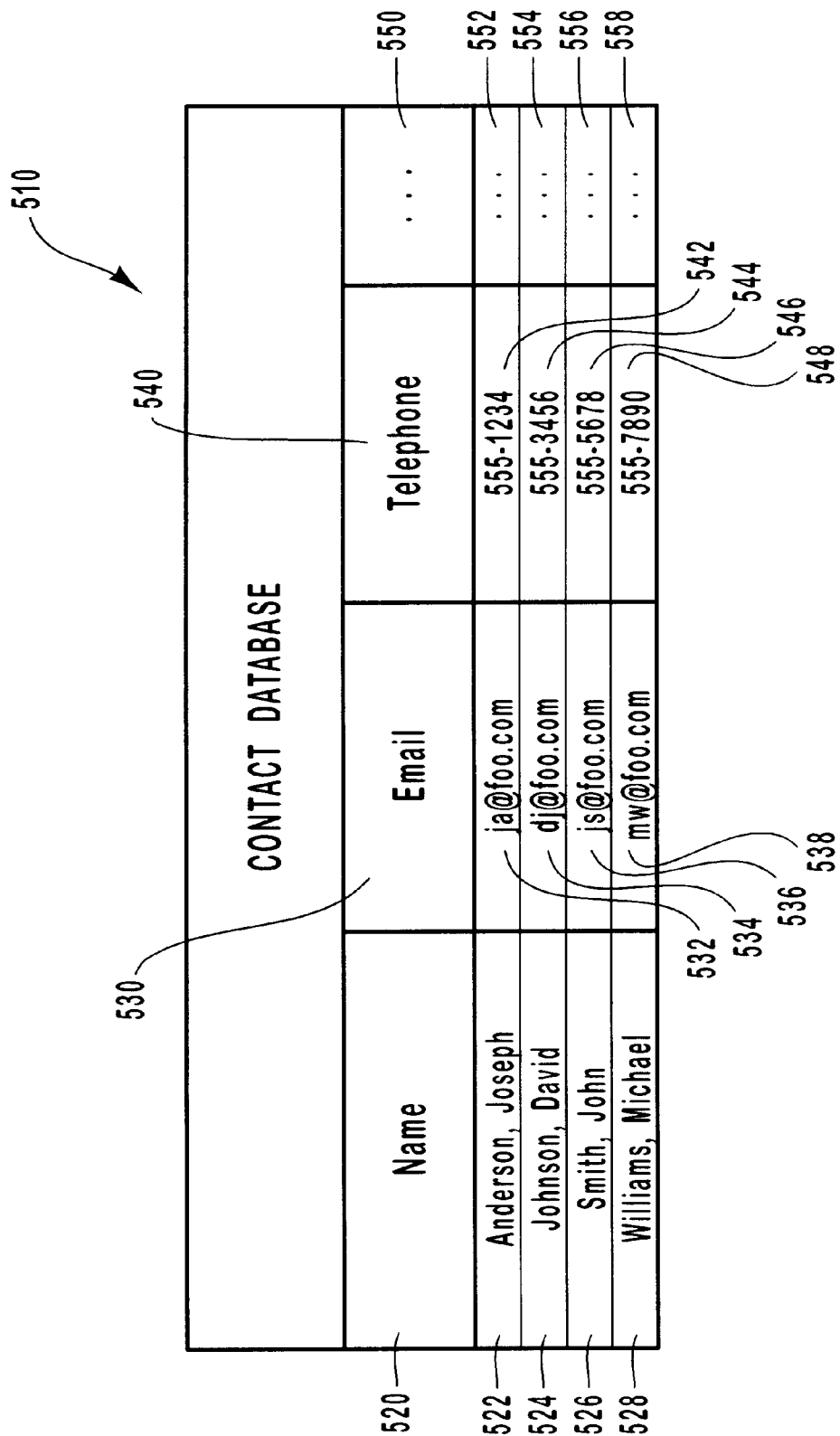
FIG. 5 is a table showing examples of the type of information that may be found in a contact database.

FIG. 5 shows contact database 510 along with the some of the information it may provide, such as name 520, e-mail address 530, telephone number 540, and other information 550. Names of those contained in the database are identified by references 522–528, with corresponding e-mail addresses 532–538, telephone number 542–548, and other information 552–558. For example, reference 522 identifies the name of Joseph Anderson, with e-mail address 532 of ja@foo.com, telephone number 542 of 555–1234, and other information 552. Contact databases may contain a wide variety of information and the specific information contained in a database is not limiting of the current invention. Using a contact database is one way to obtain the telephone number for recipients. Telephone numbers also could be obtained by prompting the user, by searching commercial databases, or by using free Internet telephone directories.

Returning to FIG. 4, each e-mail recipient who is not yet a customer is a potential customer. For purposes of illustration, it is assumed that none of the e-mail recipients is yet a customer. In addition to the normal e-mail processing that occurs at step 430, the information service uses the contact database to discover any available telephone number for each identified recipient, step 440. Using each discovered telephone number, in step 450, the information service calls each e-mail recipient to notify him or her of the e-mail sent by the customer and offers to read the e-mail. In addition, the information service may inform potential customers that the customer may be reached through the information service. Calling is one way of informing potential customers how to reach the customer through the information service.

Having contacted each recipient, in step 460, the information service then allows these potential customers to interact with the information service. For example, after reading the e-mail to the recipient, the information service may ask each recipient for a response to the e-mail and then record each potential customer's reply. However, interaction need not be limited to an e-mail response, rather, such interaction is merely a natural way to demonstrate the information service's capabilities in an e-mail context. Just as described with regard to FIG. 3, the potential customer may be allowed any interaction offered by the information service.

Finally, in step 470, the information service tracks each potential customer's interaction. Like step 360 of FIG. 3, tracking each potential customer's interaction allows the information service to adapt subsequent interactions based on prior interactions. One advantage of this customization is that it may help to identify an area of particular interest for the potential customer. Focusing on an area of interest may increase the potential customer's interest in the information service.

Although not explicitly shown in either FIG. 3 or FIG. 4, the information service may also initiate a subsequent interaction with a potential customer. For example, after a few days the information service could call the potential customer in an automated manner and use the tracked interaction data to remind the potential customer of the earlier interaction. The information service could also provide telephone task reminders or wakeup calls. In these cases, the subsequent interaction would have been requested by the potential customer, but nevertheless be initiated by the information service.

In yet another embodiment of the marketing methods of the invention, as a new subscriber provides the electronically-stored contact database 510 of FIG. 5 to the information service upon subscribing, the information service can scan the contact information and automatically communicate with each of the contacts 522, 524, 526 and 520 (i.e., potential customers). For instance, the information service can send e-mail or place a telephone call to the persons listed in the contact database, so as to inform them that the new customer can be reached by means of the information service. This active communication can inform the persons listed in the contact list 510 of the new subscriber's e-mail address, personal telephone number, or any other desired information. When this information is distributed by means of an automated telephone call to the potential customers, the potential customers can also be allowed to sample the features of the information services as has been described herein in reference to the other embodiments of the invention.

As described herein, the invention extends to marketing techniques whereby potential customers of an information service are exposed to features of the information service when communication between the potential customers and existing customers is initiated or conducted. This approach to marketing results in implicit endorsement of the information services by the existing customer. In many situations, the number of marketing opportunities can grow as the number of customers grows. Moreover, the costs associated with conducting marketing campaigns according to the invention is often less than would otherwise be incurred by operators of the information service if the operators were to avail themselves of conventional print, broadcast, and digital media.

The invention has been described herein primarily in the context of operating a viral marketing system in connection with an information service having a voice interface. Those skilled in the art, upon learning of the general principles of the invention disclosed herein, will recognize that the viral marketing system can be also applied to a basic telephony product or service that does not provide access to selectable information. Accordingly, the invention can also extend to such viral marketing systems and applications thereof.

The present invention may be embodied in other forms without departing from its spirit or essential characteristics. As properly understood, the preceding description of specific embodiments is illustrative only and in no way restrictive. The scope of the invention is, therefore, indicated solely by the appended claims as follows.

What is claimed and desired to be secured by United States Letters Patent is:

1. In a computer system that processes incoming telephone calls for current customers who have subscribed to an information service having a voice-based interface, a viral marketing method of introducing potential customers to the information service, the method comprising the acts of:
   receiving a telephone call from a potential customer of the information service, the telephone call being directed to a current customer who has subscribed to the information service;
   as the telephone call is processed, allowing the potential customer to interact with the information service; and
   offering to the potential customer an opportunity to become a new customer by subscribing to the information service, such that, if the potential customer becomes a new customer, other potential customers making telephone calls to the new customer will:
      be allowed to interact with the information service as the telephone calls are processed; and
      be offered an opportunity to subscribe to the information service.

2. A method as recited in claim 1 further comprising the act of tracking data with respect to how the potential customer interacts with the information service.

3. A method as recited in claim 2 further comprising the act of using the tracked data from one or more prior interactions to adapt the information service to the potential customer as the potential customer interacts with the information service.

4. A method as recited in claim 1 further comprising the act of the information service demonstrating a portion of its capabilities.

5. A method as recited in claim 1 wherein the act of allowing the potential customer to interact with the information service includes allowing the potential customer to browse the Internet using a telephone.

6. A method as recited in claim 1, further comprising the act of providing the potential customer with one or more stock quotes.

7. A method as recited in claim 1, further comprising the acts of identifying the potential customer.

8. A method as recited in claim 7 wherein the act of identifying the potential customer is accomplished using caller ID.

9. A method as recited in claim 7 wherein the potential customer uses a personal number associated with the current customer to call the current customer.

10. A method as recited in claim 1, further comprising the acts of:
    tracking the potential customer's interaction with the information service;
    receiving a second communication request from the potential customer;
    allowing the potential customer to again interact with the information service; and
    as the potential customer again interacts with the information service, customizing the potential customer's interaction with the information service based on the potential customer's prior tracked interaction with the information service.

11. A method as recited in claim 1 wherein the information service provides customers with unified messaging services.

12. A method as recited in claim 1, further comprising the act of allowing the current customer to determine how the telephone call is to be handled by the information service.

13. A method as recited in claim 12, wherein the information service handles the telephone call by performing at least one of:
    asking the potential customer to wait;
    taking a message from the potential customer; and
    informing the potential customer that the current customer will contact the potential customer at a later time.

14. A method as recited in claim 1 further comprising the act of informing the potential customer how more details regarding the information service may be obtained.

15. A method as recited in claim 1 further comprising the acts of:
    acquiring the telephone number of the potential customer;
    calling the potential customer in an automated manner; and
    allowing the potential customer to interact further with the information service.

16. A method as recited in claim 1, further comprising the acts of:
    interrupting the potential customer's interaction with the information service;
    permitting the potential customer and the current customer to communicate by telephone; and
    after the potential customer and the current customer have communicated by telephone, allowing the potential customer to again interact with the information service.

17. In a computer system that processes incoming telephone calls for current customers who have subscribed to an information service that provides telephone access to the Internet, a viral marketing method of introducing potential customers to the information service, the method comprising the acts of:
    receiving a telephone call from a potential customer of the information service, the telephone call being directed to a current customer who has subscribed to the information service;
    identifying the potential customer;
    as the telephone call is processed;
        allowing the potential customer to obtain telephone access to the Internet provided by the information service so as to demonstrate capabilities of the information service to the potential customer; and
        transmitting information by telephone to the potential customer indicating that the current customer has subscribed to the information service;
    tracking how the potential customer interacts with the information service, such that interaction by the potential customer with the information service during any subsequent telephone call to a current customer can be adapted based on the potential customer's tracked information;
    offering to the potential customer an opportunity to become a new customer by subscribing to the information service, such that, if the potential customer becomes a new customer, other potential customers making telephone calls to the new customer will:
        receive information indicating that the new customer has subscribed to the information service; and
        be offered an opportunity to subscribe to the information service.

18. A method a recited in claim 17, further comprising the act allowing the current customer to determine how the telephone call should be handled by the information service by having the information service perform at least one of:
    asking the potential customer to wait;
    taking a message from the potential customer; and
    informing the potential customer that the current subscriber will contact the potential customer at a later time.

19. In a computer system that processes incoming telephone calls for current customers who have subscribed to an information service that provides telephone access to the Internet, a viral marketing method of introducing potential customers to the information service, the method comprising the acts of:
    receiving a telephone call from a potential customer of the information service, the telephone call being directed to a current customer who has subscribed to the information service;
    identifying the potential customer;
    as the telephone call is processed:
        allowing the potential customer to obtain telephone access to the Internet provided by the information service so as to demonstrate capabilities of the information service to the potential customer; and
        transmitting information by telephone to the potential customer indicating that the current customer has subscribed to the information service; and
    offering to the potential customer an opportunity to become a new customer by subscribing to the information service, such that, if the potential customer becomes a new customer, other potential customers making incoming telephone calls to the new customer will:
        receive information indicating that the new customer has subscribed to the information service; and
        be offered an opportunity to subscribe to the information service.

20. A method as recited in claim 19, further comprising the steps of:
    receiving a subsequent telephone call from the potential customer; and adapting the potential customer's interaction with the information service during the subsequent telephone call based on the potential customer's prior interaction.

21. A method as recited in claim 19 wherein the information service provides customers with unified messaging services.

22. A method as recited in claim 19 further comprising the steps of:

acquiring the telephone number of the potential customer;

calling the potential customer; and allowing the potential customer to interact further with the information service.

23. In a computer system that processes e-mail for current customers who have subscribed to an information service having a voice-based interface, a viral marketing method of introducing potential customers to the information service, the method comprising the acts of:

receiving at the information service an e-mail from a current customer of the information service and determining that the e-mail is being directed to a potential customer of the information service;

the information service thereafter automatically initiating a telephone call to the potential customer to advise the potential customer of the e-mail;

as the telephone call is processed, allowing the potential customer to interact with the information service; and offering to the potential customer an opportunity to become a new customer by subscribing to the information service, such that, if the potential customer becomes a new customer, other potential customers making telephone calls to the new customer will:

be allowed to interact with the information service as the telephone calls are processed; and be offered an opportunity to subscribe to the information service.

24. A method as recited in claim 23, further comprising, during the telephone call, informing the potential customer that the current customer has subscribed to the information service.

25. A method as recited in claim 23, further comprising the act of providing the potential customer an opportunity to respond to the e-mail.

26. A method as recited in claim 23 wherein the information service provides unified messaging services.

27. A method as recited in claim 23, wherein the potential customer can choose to browse the Internet during the telephone call using the telephony-based interface.

28. A method as recited in claim 23, further comprising the act of acquiring the telephone number of the potential customer from the current customer.

* * * * *